(12) United States Patent
Ge et al.

(10) Patent No.: US 11,349,162 B2
(45) Date of Patent: May 31, 2022

(54) AUTOMOTIVE BATTERY HEATER

(71) Applicant: Ford Global Technologies, LLC, Dearborn, MI (US)

(72) Inventors: Baoming Ge, Okemos, MI (US); Lihua Chen, Farmington Hills, MI (US); Boris Curuvija, West Bloomfield, MI (US); Fan Xu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 16/743,441

(22) Filed: Jan. 15, 2020

(65) Prior Publication Data

US 2021/0218085 A1 Jul. 15, 2021

(51) Int. Cl.
*H01M 10/63* (2014.01)
*H01M 10/48* (2006.01)
*H01M 10/615* (2014.01)
*H01M 10/625* (2014.01)
*B60L 50/64* (2019.01)
*B60L 58/27* (2019.01)
(Continued)

(52) U.S. Cl.
CPC ............. *H01M 10/63* (2015.04); *B60L 50/64* (2019.02); *B60L 58/27* (2019.02); *H01M 10/486* (2013.01); *H01M 10/615* (2015.04); *H01M 10/625* (2015.04); *H01M 10/6571* (2015.04); *B60L 2240/545* (2013.01); *H01M 2220/20* (2013.01); *H02K 7/006* (2013.01)

(58) Field of Classification Search
CPC .... B60L 2240/545; B60L 50/64; B60L 58/27; H01M 10/425; H01M 10/4264; H01M 10/486; H01M 10/615; H01M 10/625; H01M 10/63; H01M 10/6571; H01M 2220/20; H02K 7/006; Y02T 10/70
See application file for complete search history.

(56) References Cited

U.S. PATENT DOCUMENTS

| | | | | |
|---|---|---|---|---|
| 2012/0112695 A1* | 5/2012 | Nishi | ...................... | B60L 58/25 |
| | | | | 320/109 |
| 2015/0105956 A1* | 4/2015 | Wu | ........................ | B60L 15/20 |
| | | | | 701/22 |
| 2020/0144684 A1* | 5/2020 | Takamatsu | .......... | H02M 7/5395 |

FOREIGN PATENT DOCUMENTS

| | | |
|---|---|---|
| CN | 102473976 B | 5/2012 |
| CN | 110034597 A | 7/2019 |
| GB | 2414569 A | 11/2005 |

\* cited by examiner

*Primary Examiner* — Adam A Arciero
(74) *Attorney, Agent, or Firm* — David B Kelley; Brooks Kushman P.C.

(57) ABSTRACT

A vehicle power system includes a traction battery, an electric machine configured to receive power from the traction battery, switching circuitry connected between the traction battery and electric machine, and including pairs of switches connected in parallel, and a capacitor connected with and between the pairs such that the capacitor shares a common terminal with each of the switches of the pairs, and a controller configured to responsive to a temperature of the traction battery being less than a first threshold, activate the switches of each of the pairs in complementary fashion at a switching frequency corresponding to a resonant frequency defined by a capacitance of the capacitor and an inductance of the traction battery to cause AC current to circulate between the traction battery and switching circuitry to generate heat within the traction battery, and responsive to the temperature exceeding a second threshold, deactivate the switches.

20 Claims, 3 Drawing Sheets

(51) Int. Cl.
*H01M 10/6571* (2014.01)
*H02K 7/00* (2006.01)

AUTOMOTIVE BATTERY HEATER

TECHNICAL FIELD

The present disclosure relates to a high-voltage battery heating circuit and controller for an electric vehicle.

BACKGROUND

Battery electric vehicles (BEV) and/or hybrid electric vehicles (HEV) use high voltage batteries to provide energy for vehicle propulsion and various types of vehicle loads. Lithium-ion (Li-ion) batteries are often used in BEVs and HEVs. However, due to their nature, Li-ion batteries may be affected by cold temperature. In general, the colder the battery temperature, the less energy the Li-ion battery may store, reducing vehicle range. In addition, cold temperatures may also affect battery charging. Certain Li-ion batteries may not be charged rapidly when the temperature is below 10° C.

SUMMARY

A vehicle includes a traction battery having a DC bus, wherein the traction battery has a parasitic inductance and an internal resistance, and a heating controller circuit coupled between positive and negative terminals of the DC bus of the traction battery, wherein the heating controller circuit includes a first and third switch connected in series between the positive and negative terminals of the DC bus, a second and fourth switch connected in series between the positive and negative terminal of the DC bus in parallel with the first and third switch, a capacitor sharing a first common terminal with the first and third switch, and a second common terminal with the second and fourth switch, a gate signal controller having a first output terminal connected to control terminals of the first and fourth switches, and a second output terminal connected to control terminals of the second and third switches, a temperature sensor configured to measure a battery temperature of the traction battery, and a temperature comparator configured to, responsive to verifying the battery temperature measured by the temperature sensor is below a predefined threshold, output an activation signal to the gate signal controller, wherein the gate signal controller is further configured to, responsive to receiving the activation signal, output a first square wave signal having a duty cycle via the first output terminal to toggle the first and fourth switches at a predefined switching frequency corresponding to a resonant frequency of the capacitor and parasitic inductance, and output a second square wave signal complementary to the first square wave signal via the second output terminal to toggle the second and third switches to generate a battery current flowing through the internal resistance of the traction battery to generate heat.

A method for generating heat for an automotive electric power supply system that includes a vehicle traction battery having a parasitic inductance and an internal resistance, and a heating controller circuit, wherein the heating controller circuit includes a first and third switch connected in series between the positive and negative terminals of a DC bus of the traction battery, a second and fourth switch connected in series between the positive and negative terminals of the DC bus in parallel with the first and third switch, a capacitor sharing a first common terminal with the first and third switch, and a second common terminal with the second and fourth switch, and a gate signal controller having a first output terminal connected to control terminals of the first and fourth switch, and a second output terminal connected to control terminals of the second and third switch, the method includes responsive to detecting a battery temperature is below a predefined threshold, output a first square wave signal having a duty cycle via the first output terminal to toggle the first and fourth switches at a predefined switching frequency corresponding to a resonant frequency of the capacitor and parasitic inductance, and output a second square wave signal complementary to the first square wave signal via the second output terminal to toggle the second and third switches to generate a battery current flowing through the internal resistance of the traction battery to generate heat, and responsive to detecting the battery temperature has increased above a second threshold, deactivate the first, second, third, and fourth switches.

A vehicle power system includes a traction battery, an electric machine configured to receive power from the traction battery, switching circuitry connected between the traction battery and electric machine, and including pairs of switches connected in parallel, and a capacitor connected with and between the pairs such that the capacitor shares a common terminal with each of the switches of the pairs, and a controller configured to responsive to a temperature of the traction battery being less than a first threshold, activate the switches of each of the pairs in complementary fashion at a switching frequency corresponding to a resonant frequency defined by a capacitance of the capacitor and an inductance of the traction battery to cause AC current to circulate between the traction battery and switching circuitry to generate heat within the traction battery, and responsive to the temperature exceeding a second threshold, deactivate the switches.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
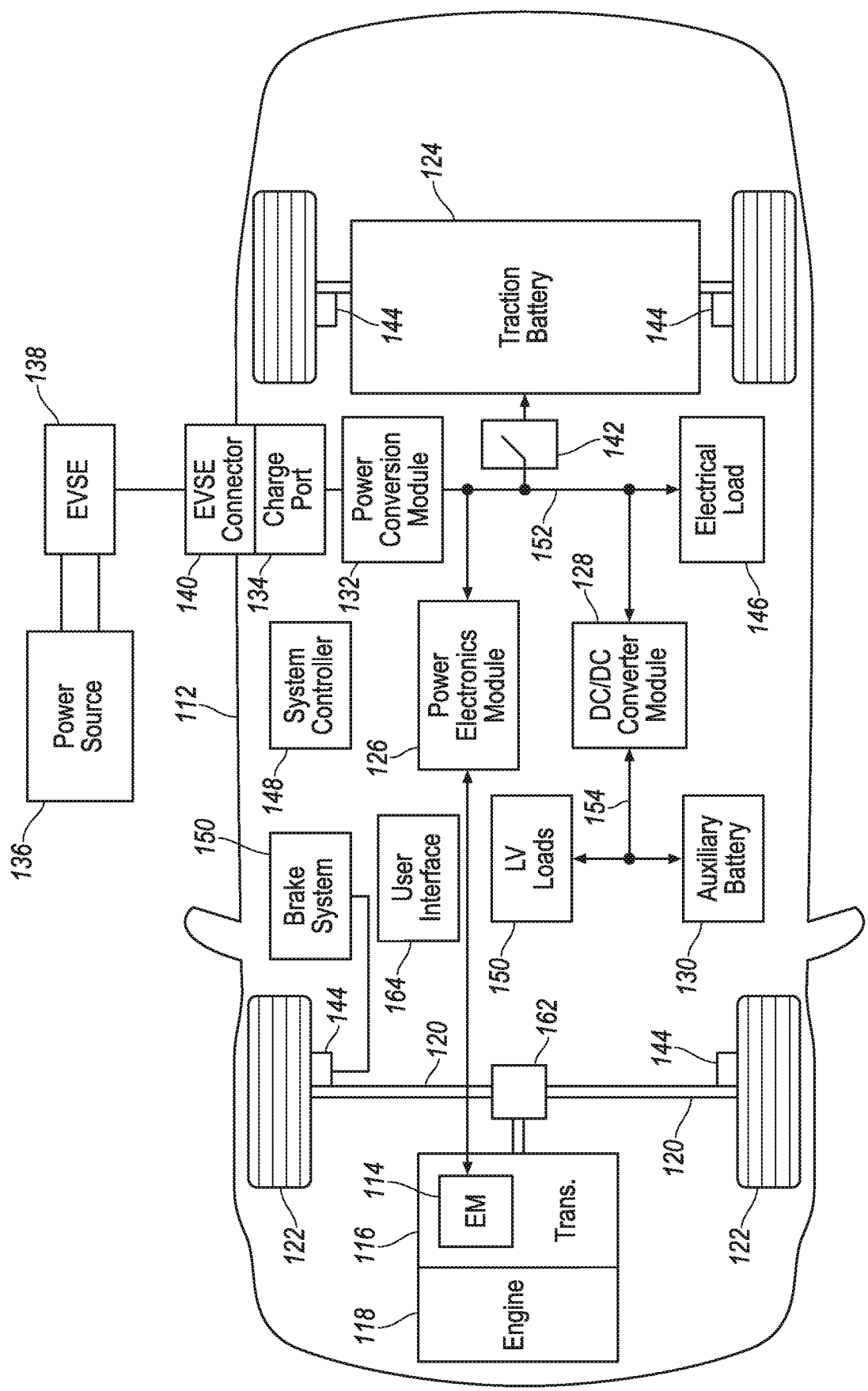
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a BEV. In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (may also be referred to as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus/rail. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for braking the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for slowing the vehicle. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
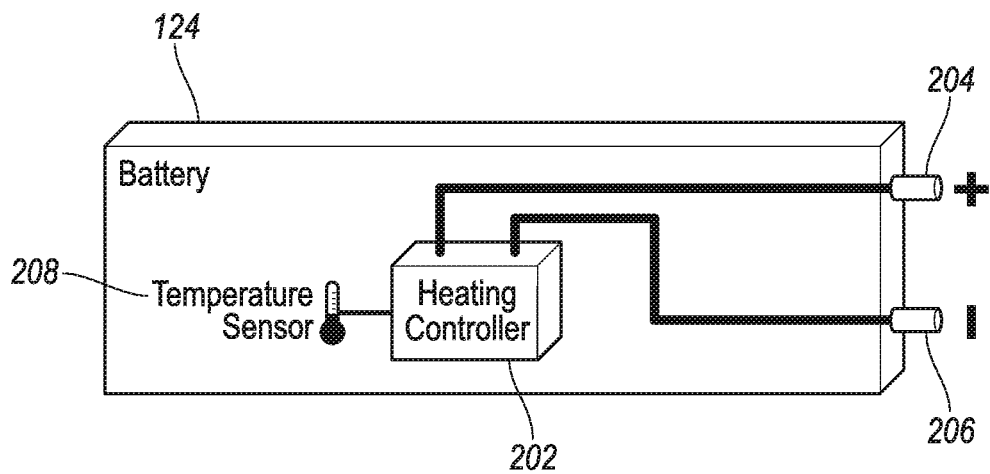
FIG. 2 is a diagram of a vehicle battery with a battery heater.

The traction battery 124 may be provided with a heating controller 202 configured to monitor battery temperature and control self-heating operations. FIG. 2 depicts a block diagram of the traction battery 124 coupled to a heating controller 202. The heating controller 202 may be coupled to the traction battery in various forms. As an example illustrated in FIG. 2, the heating controller 202 may be integrated with the traction battery 124 connected between a positive terminal 204 and a negative terminal 206. The heating controller 202 may be connected to one or more temperature sensors 208 configured to measure temperature at one ore more locations of the traction battery. Due to the specific configuration and design, the traction battery 124 may include more than one battery cell (not shown) located at various locations of the traction battery 124. Temperature may vary due to the location of the battery cells. Therefore, multiple temperature sensors 208 may be positioned at different locations of the traction battery 124 to provide a more accurate temperature measurement. The heating controller 202 may be configured to control the operation of a battery heating circuit (to be discussed in detail below with reference to FIG. 3) based on the input of the temperature sensor 208. The heating controller 202 may be configured to be an automatic controller without the need for human control input. Alternatively, the heating controller 202 may be configured to communicate with other controllers of the vehicle 112 such as the system controller 148 to receive human control or remote control inputs. Although the heating controller 202 is illustrated as integrated with the traction battery 124, it is noted that the heating controller 202 may be separated from the traction battery 124 in other embodiments depending on the specific design need.

Figure 3:
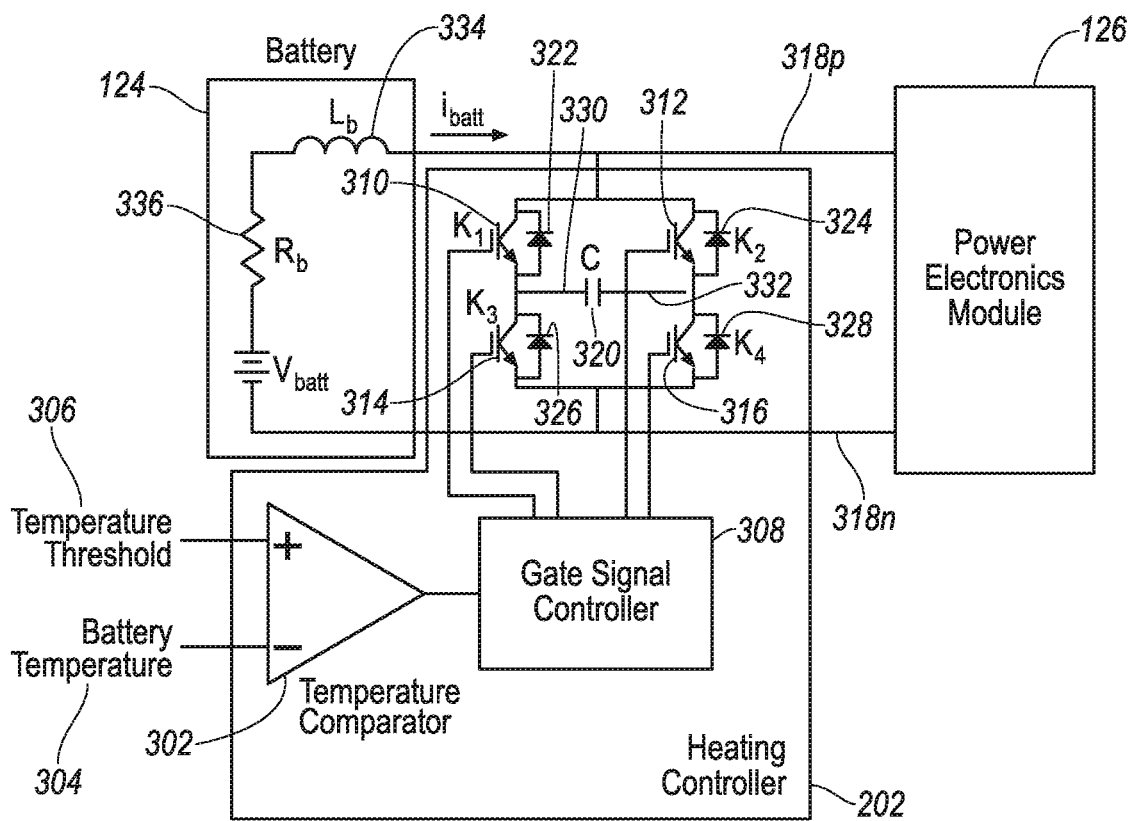
FIG. 3 is a diagram of the vehicle battery heater circuit.

FIG. 3 depicts a schematic diagram of the battery heating controller circuit 202. With continuing reference to FIGS. 1 and 2, the heating controller 202 may include a temperature comparator 302 configured to compare the traction battery temperature 304 measured by the temperature sensors 208 with a predefined temperature threshold 306 to provide an output signal. The temperature comparator 302 may include various electronic components. In the present example, the temperature comparator 302 may include an operational amplifier configured to perform the temperature data comparison operation. The temperature threshold 306 may be a preset value depending on the specific vehicle and battery configuration and design need. As an example, the temperature threshold 306 may be set to 10° C. Responsive to detecting the battery temperature 304 as measured by the temperature sensor 208 is lower than the temperature threshold 306, the temperature comparator 302 outputs an activation signal to a gate signal controller 308 configured to output gate control signals to one or more switching devices of the heating controller 202.

As illustrated in FIG. 3, the heating controller 202 may include a plurality of switching devices K1 310, K2 312, K3 314 and K4 316. The switching devices K1 310, K2 312, K3 314 and K4 316 may be Insulated Gate Bipolar Transistors (IGBT), Metal Oxide Semiconductor Field Effect Transistors (MOSFET), or other solid-state switching devices. The switching devices K1 310, K2 312, K3 314 and K4 316 may be configured to selectively couple a positive terminal and a negative terminal of a high-voltage rail (a.k.a. DC rail, high-voltage bus, or DC bus) 318 via a resonant capacitor 320 (to be discussed in detail below). The high-voltage rail 318 may be connected between the positive/negative terminals of the battery 124 and power electronics module 126 as well as other components of the vehicle 112. Each of the switching devices K1 310, K2 312, K3 314 and K4 316 may have an associated diode 322, 324, 326, and 328 connected in parallel to provide a path for inductive current when the switching device is in a non-conducting state. Each of the switching devices K1 310, K2 312, K3 314 and K4 316 may have a control terminal for controller operations of the associated switching device. The control terminals may be electrically coupled to the gate signal controller 308. The gate signal controller 308 may include associated circuitry to drive and monitor the control terminals.

The resonant capacitor 320 may include a first terminal 330 connected to the first switching device K1 310 and the third switching device K3 314, and a second terminal 332 connected to the second switching device K2 312 and the fourth switching device K4 316. The first switching device K1 310 may selectively couple the positive terminal of the high-voltage rail 318 to the first terminal 330 of the capacitor 320. The first diode 322 may be coupled in parallel to the first switching device K1 310. The second switching device K2 312 may selectively couple the positive terminal of the high-voltage rail 318 to the second terminal 332 of the capacitor 320. The second diode 324 may be coupled in parallel to the second switching device K2 310. The third switching device K3 314 may selectively couple the negative terminal of the high-voltage rail 318 to the first terminal 330 of the capacitor 320. The third diode 326 may be coupled in parallel to the third switching device K3 314. The fourth switching device K4 316 may selectively couple the negative terminal of the high-voltage rail 318 to the second terminal 332 of the capacitor 320. The fourth diode 328 may be coupled in parallel to the fourth switching device K4 316.

As illustrated in FIG. 3, the traction battery 124 may include a stray/parasitic inductance $L_b$ 334 caused by various electronic components of the traction battery 124. With the inductance 334 and the capacitor 320, an LC resonant circuit may be achieved with appropriate switching frequency on the switching devices K1 310, K2 312, K3 314 and K4 316. When the LC resonant current flow through an internal resistance 336 of the traction battery 124, heat may be generated to keep the battery cells warm. The internal resistance 336 may be inherently formed by various components such as wires and cells within the traction battery 124. Alternatively, the internal resistance 336 may also include a deliberate resistor having a predefined value added to the traction battery 124 to provide a desired heating effect depending the specific design need. Due to the LC resonating nature of the circuit, a resonant current $I_{batt}$ flowing into the battery has an amplitude calculated by the following equation:

$$I_{batt} = \sqrt{\frac{C}{L_b}} V_{batt} \quad (1)$$

Since the current is directly related to the heating effect, the current $I_{batt}$ may be adjusted and designed by adjusting one or more of the values of the capacitor 320, the inductance 334 and the battery voltage. However, since the values of the parasitic inductance 334 and battery voltage are usually fixed, the amplitude of the battery current may be more practically adjusted by modifying the capacitor 320 during the design process. The resonant frequency may be calculated by the following equation:

$$f_{resonant} = \frac{1}{2\pi\sqrt{L_b C}} \quad (2)$$

The following example illustrates the operation of the heating controller circuit 202. At an inactivated condition, all switching devices K1 310, K2 312, K3 314 and K4 316 are turned off which prohibits any current flowing through the resonant capacitor 320. In such as state, no battery current is generated by the heating controller circuit 202 to provide heat. Responsive to detecting the battery temperature 304 is lower than the temperature threshold 306, the temperature comparator 302 outputs an activation signal to the gate signal controller 308 to activate gate switching activities. The temperature threshold 306 may be predefined depending on design need. For instance, the temperature threshold 306 may be 10° C. Responsive to receiving the activation signal, the gate signal controller 308 is activated to output a square wave signal and toggle (i.e. turn on/off) the switching devices K1 310, K2 312, K3 314 and K4 316 at a predefined order and timing. In the present example illustrated with reference to FIG. 3, the first and fourth switching devices K1 310 and K4 316 may be commonly controlled to toggle together at a 50% duty cycle, whereas the second and third switching devices K2 312 and K3 314 may be commonly controlled together to perform a complementary switching activity. In other words, when first and fourth switching devices K1 310 and K4 316 are turned on, the second and third switching devices K2 312 and K3 314 are turned off, and vice versus. The switching frequency may be designed by the following equation:

$$f_{sw} = \frac{f_{resonant}}{2k} \quad (3)$$

where k=1, 2, 3 . . . during operation. The specific value of k may be selected depending on design need. During the design process, for example, if the resonant frequency $f_{resonant}$ is determined and fixed, a higher value of k may lead to lower switching frequency $f_{sw}$, which may reduce the switching speed and durability requirement/specification for the switch devices. In other words, having a higher value of k may reduce the cost of the circuit. In some other cases, the switching frequency $f_{sw}$ may be predetermined during the design process. A higher value of k may lead to a higher resonant frequency $f_{resonant}$ such that lower values for the resonant capacitor 320 and/or inductance 334 are required. This situation may be helpful when the parasitic inductance 334 is small and no deliberate inductors are added to the circuit.

Figure 4:
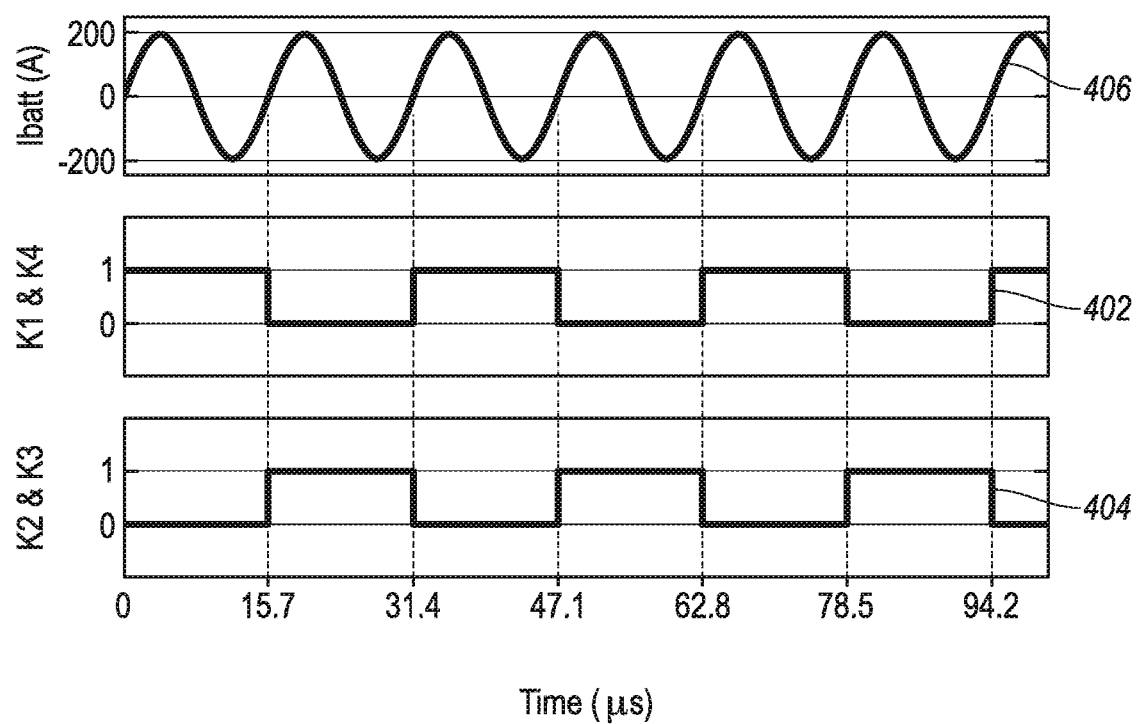
FIG. 4 is a waveform diagram of the vehicle battery heater circuit.

Referring to FIG. 4, an example waveform diagram of the battery heating controller circuit 202 is illustrated. With continuing reference to FIGS. 1-3, in the present example, the following data values are selected for demonstrative purposes: voltage of the traction battery 124 $V_{batt}$=400V, value of the inductance 334 $L_b$=5 µH, and value of the capacitor 320 C=1.25 µF. Using equation (2) presented above, the resonant frequency of the heating controller circuit 202 may be calculated as $f_{resonant}$=63.67 kHz. In the present example, assuming k=1, the switching frequency is $f_{sw}$=$f_{resonant}$/2=31.83 kHz. With the switching frequency calculated, the switching period $t_{sw}$=1/$f_{sw}$=31.4 µs. As illustrated in FIG. 4, a switching activity waveform diagram 402 for the first and fourth switching devices K1 310 and K4 316, and a switching activity waveform diagram 404 for the second and third switching devices K2 312 and K3 314 are illustrated. The first and fourth switching devices K1 310 and K4 316 perform a complementary switching behavior to the second and third switching devices K2 312 and K3 314. All switching devices have a switching period of 31.4 µs as calculated. When the switching devices perform the switching activity at the predefined frequency corresponding to the LC resonant frequency, the resonant capacitor 320 is charged and discharge at a predefined frequency. Coupled with the inductance 334, the circuit 202 may oscillate/resonate at the resonant frequency calculated using equation (2) presented above. As illustrated in waveform diagram 406, the battery current $I_{batt}$ resembles a sinusoidal AC waveform having an amplitude corresponding to the value calculated using equation (1) based on LC resonance. Here, it is noted that all switching devices K1 310, K2 312, K3 314 and K4 316 switch at zero current. Therefore, no switching loss is generated by the switching devices. With the AC current of waveform 406 flowing through the traction battery 124, heat may be generated by the internal resistance Rb 336 to keep the battery warm. In the present example, the amplitude of the AC current is approximately 200 A. Depending on the specific design need, the amplitude of the AC current may be finely tuned by modifying the value of the capacitor 320 to fulfill the specific need. The gate signal controller 308 may be configured to continue to perform the gate switching activity until the temperature comparator 302 determines the battery temperature 304 is above a threshold indicative of the traction battery 124 being warmed up. In response, the temperature comparator 302 may send a deactivation signal to the gate signal controller 308 to stop the gate switching. The threshold for deactivation may be the same as the temperature threshold 306 to activate the circuit. Alternatively, the deactivation temperature threshold may be set to be higher than the activation threshold 306 to leave a margin and prevent an overly frequent activation/deactivation of the heating controller 202.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for generating heat for an automotive electric power supply system that includes a vehicle traction battery having a parasitic inductance and an internal resistance, and a heating controller circuit, wherein the heating controller circuit includes a first and third switch connected in series between the positive and negative terminals of a DC bus of the traction battery, a second and fourth switch connected in series between the positive and negative terminals of the DC bus in parallel with the first and third switch, a capacitor sharing a first common terminal with the first and third switch, and a second common terminal with the second and fourth switch, and a gate signal controller having a first output terminal connected to control terminals of the first and fourth switch, and a second output terminal connected to control terminals of the second and third switch, the method comprising:

responsive to detecting a battery temperature is below a predefined threshold, output a first square wave signal having a duty cycle via the first output terminal to toggle the first and fourth switches at a predefined switching frequency corresponding to a resonant frequency of the capacitor and parasitic inductance, and output a second square wave signal complementary to the first square wave signal via the second output terminal to toggle the second and third switches, to generate a battery current flowing through the internal resistance of the traction battery to generate heat; and responsive to detecting the battery temperature has increased above a second threshold, deactivate the first, second, third, and fourth switches.

2. The method of claim 1, wherein the predefined switching frequency has a value that is a function of a value of the parasitic inductance, and a capacitance of the capacitor, and 2k, wherein k is a natural number equal to or greater than one.

3. The method of claim 1, wherein the battery current is a sinusoidal AC current having an amplitude that depends on a value of the parasitic inductance, a value capacitance of the capacitor, and a voltage of the traction battery.

4. The method of claim 3, wherein the gate signal controller is further configured to, toggle the first and second square waves at a time when the battery current is substantially zero.

5. The method of claim 1, wherein the second threshold is equal to or greater than the predefined threshold.

6. The method of claim 1, wherein the switches are Integrated Gate Bipolar Transistors.

7. The method of claim 1, wherein the switches are Metal Oxide Semiconductor Field Effect Transistors.

8. A vehicle power system comprising:
a traction battery;
an electric machine configured to receive power from the traction battery;
switching circuitry connected between the traction battery and electric machine, and including
pairs of switches connected in parallel, and
a capacitor connected with and between the pairs such that the capacitor shares a common terminal with each of the switches of the pairs; and
a controller configured to
responsive to a temperature of the traction battery being less than a first threshold, activate the switches of each of the pairs in complementary fashion at a switching frequency corresponding to a resonant frequency defined by a capacitance of the capacitor and an inductance of the traction battery to cause AC current to circulate between the traction battery and switching circuitry to generate heat within the traction battery, and
responsive to the temperature exceeding a second threshold, deactivate the switches.

9. The vehicle power system of claim 8, wherein the switching frequency is a function of ½k, where k is a natural number.

10. The vehicle power system of claim 8, wherein the switches are transistors.

11. The vehicle power system of claim 8, wherein the controller is further configured to, toggle the pairs of switches at a time when the AC current is substantially zero.

12. A vehicle comprising:
a traction battery having a DC bus, wherein the traction battery has a parasitic inductance and an internal resistance; and
a heating controller circuit coupled between positive and negative terminals of the DC bus of the traction battery, wherein the heating controller circuit includes
a first and third switch connected in series between the positive and negative terminals of the DC bus,
a second and fourth switch connected in series between the positive and negative terminal of the DC bus in parallel with the first and third switch,
a capacitor sharing a first common terminal with the first and third switch, and a second common terminal with the second and fourth switch,
a gate signal controller having a first output terminal connected to control terminals of the first and fourth switches, and a second output terminal connected to control terminals of the second and third switches,
a temperature sensor configured to measure a battery temperature of the traction battery, and
a temperature comparator configured to, responsive to verifying the battery temperature measured by the temperature sensor is below a predefined threshold, output an activation signal to the gate signal controller,
wherein the gate signal controller is further configured to, responsive to receiving the activation signal, output a first square wave signal having a duty cycle via the first output terminal to toggle the first and fourth switches at a predefined switching frequency corresponding to a resonant frequency of the capacitor and parasitic inductance, and output a second square wave signal complementary to the first square wave signal via the second output terminal to toggle the second and third switches, to generate a battery current flowing through the internal resistance of the traction battery to generate heat.

13. The vehicle of claim 12, wherein the predefined switching frequency has a value that is a function of a value of the parasitic inductance, a capacitance of the capacitor, and 2k, wherein k is a natural number equal to or greater than one.

14. The vehicle of claim 12, wherein the battery current is a sinusoidal AC current having an amplitude that depends on a value of the parasitic inductance, a value of capacitance of the capacitor, and a voltage of the traction battery.

15. The vehicle of claim 14, wherein the gate signal controller is further configured to toggle the first and second square waves at a time when the battery current is substantially zero.

16. The vehicle of claim 12, wherein the temperature comparator is further configured to, responsive to verifying the battery temperature has increased above a second threshold, output a deactivation signal to the gate signal controller to turn off all the switches.

17. The vehicle of claim 16, wherein the second threshold is greater than the predefined threshold.

18. The vehicle of claim 12, wherein the heating controller circuit further includes an additional inductor separated from the capacitor by at least one switch, and wherein the predefined switching frequency corresponding to a resonant frequency of the capacitor, the parasitic inductance, and an inductance of the additional inductor.

19. The vehicle of claim 12, wherein the switches are Integrated Gate Bipolar Transistors.

20. The vehicle of claim 12, wherein the switches are Metal Oxide Semiconductor Field Effect Transistors.

* * * * *